US012695837B2

(12) United States Patent (10) Patent No.: US 12,695,837 B2

Beppu et al. (45) Date of Patent: Jul. 28, 2026

(54) IMAGE READING DEVICE AND IMAGE READING METHOD FOR DOCUMENT DETECTION

(71) Applicant: SEIKO EPSON CORPORATION, Tokyo (JP)

(72) Inventors: Wataru Beppu, Kitakyushu (JP); Rei Tsutsui, Kitakyushu (JP); Noriyuki Koyanagi, Kitakyushu (JP); Kazuhiko Arimori, Kitakyushu (JP); Keiichiro Fukumasu, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/395,809

(22) Filed: Dec. 26, 2023

(65) Prior Publication Data

US 2024/0214499 A1 Jun. 27, 2024

(30) Foreign Application Priority Data

Dec. 27, 2022 (JP) ................................. 2022-210181

(51) Int. Cl.
*H04N 1/00* (2006.01)

(52) U.S. Cl.
CPC ..... *H04N 1/00774* (2013.01); *H04N 1/00604* (2013.01); *H04N 1/0071* (2013.01); *H04N 1/00713* (2013.01); *H04N 1/00718* (2013.01); *H04N 1/00734* (2013.01); *H04N 1/00745* (2013.01); *H04N 2201/0081* (2013.01)

(58) Field of Classification Search
CPC ........... H04N 1/00774; H04N 1/00604; H04N 1/0071; H04N 1/00713; H04N 1/00718; H04N 1/00734; H04N 1/00745; H04N 2201/0081
See application file for complete search history.

(56) References Cited

U.S. PATENT DOCUMENTS

| | | | | |
|---|---|---|---|---|
| 2008/0273228 A1* | 11/2008 | Takano | .............. | H04N 1/00681 |
| | | | | 358/497 |
| 2011/0170151 A1* | 7/2011 | Motoyama | ......... | H04N 1/00721 |
| | | | | 358/474 |
| 2013/0083373 A1* | 4/2013 | Saito | .................. | H04N 1/00771 |
| | | | | 358/488 |
| 2015/0281488 A1 | 10/2015 | Kawauchi | | |
| 2015/0373219 A1* | 12/2015 | Watanabe | .......... | H04N 1/00737 |
| | | | | 358/488 |

(Continued)

FOREIGN PATENT DOCUMENTS

JP 2015-195442 A 11/2015

*Primary Examiner* — Nicholas Pachol

(74) *Attorney, Agent, or Firm* — WORKMAN NYDEGGER

(57) ABSTRACT

When a size of a document is not specified, a control unit of an image reading device identifies, for image data generated as a reading result by a reading unit, a region of the document by detecting an edge of the document. When the size of the document is specified, the control unit searches the image data, at a position within a first range including a position away from an origin by a first distance, for a downstream end of the document from a downstream end of the image data toward upstream in a transport direction, and based on a position of the downstream end of the document identified by the searching, identifies as a region of the document a region corresponding to the size of the document specified.

12 Claims, 8 Drawing Sheets

(56)     References Cited

U.S. PATENT DOCUMENTS

| | | | |
|---|---|---|---|
| 2017/0111524 A1* | 4/2017 | Tajima | H04N 1/00687 |
| 2018/0220021 A1* | 8/2018 | Arimori | H04N 1/0071 |
| 2018/0220022 A1* | 8/2018 | Yoshikaie | H04N 1/00755 |
| 2018/0227450 A1* | 8/2018 | Motoyama | H04N 1/00708 |
| 2018/0229956 A1* | 8/2018 | Yoshimura | B65H 7/20 |
| 2019/0037092 A1* | 1/2019 | Shiota | H04N 1/00718 |
| 2020/0201232 A1* | 6/2020 | Umi | H04N 1/00774 |
| 2021/0058519 A1* | 2/2021 | Shiota | H04N 1/00769 |
| 2021/0144273 A1* | 5/2021 | Nakayoshi | H04N 1/00748 |

* cited by examiner

IMAGE READING DEVICE AND IMAGE READING METHOD FOR DOCUMENT DETECTION

The present application is based on, and claims priority from JP Application Serial Number 2022-210181, filed Dec. 27, 2022, the disclosure of which is hereby incorporated by reference herein in its entirety.

BACKGROUND

1. Technical Field

The present disclosure relates to an image reading device and an image reading method.

2. Related Art

A scanner that reads a document to be read by an image sensor while transporting the document includes a sensor that detects the document before reading.

As a related art, there is disclosed a configuration of an image reading device including a feed roller that transports a document, a document detection sensor disposed downstream of the feed roller in a transport direction, and a reading unit disposed downstream of the document detection sensor in the transport direction (see JP-A-2015-195442).

When a leading end of the document is detected by the document detection sensor, the image reading device can additionally start reading after transport for a time corresponding to a distance from the document detection sensor to the reading unit. However, as in JP-A-2015-195442, in a configuration in which the document detection sensor is disposed downstream of the feed roller, and the distance from the document detection sensor to the reading unit is relatively short, a part of the document cannot be read in some cases. Specifically, in a state in which the document is inclined with respect to the transport direction, when reading is started at predetermined timing after the document detection sensor detects the leading end of the document, a part of the leading end of the document has already passed through the reading unit, and an image of the part may be lost in a reading result of the document.

In order to avoid the inconvenience caused by the configuration in which the distance from the document detection sensor to the reading unit is short as described above, it is conceivable that the document detection sensor is disposed upstream of the feed roller in the transport direction.

However, when the document detection sensor is disposed upstream of the feed roller, the document is transported by a roller located further upstream until the leading end of the document passes through the document detection sensor and reaches the feed roller, and when the leading end of the document reaches the feed roller, the document is further transported by the feed roller. Therefore, due to the fact that the distance from the document detection sensor to the reading unit is relatively long, transport accuracy of the document from the document detection sensor to the reading unit is likely to vary. Therefore, even when start timing of subsequent reading is determined based on the timing at which the document is detected by the document detection sensor, a positional relationship between the leading end of the document and the reading unit at the reading start timing is not stable, and there was a possibility that even when an attempt is made to read the document from the leading end, the leading end of the document may be lost in a reading result.

SUMMARY

Provided is an image reading device including a first transport roller configured to transport a document in a predetermined transport direction, a second transport roller provided downstream of the first transport roller in the transport direction and configured to transport the document in the transport direction, a reading unit provided downstream of the second transport roller and configured to read the document transported, a document detection unit provided, in the transport direction, between a position where the first transport roller comes into contact with the document and a position where the second transport roller comes into contact with the document, the document detection unit being configured to detect the document, and a control unit, wherein the document detection unit is located at a first position, the first position being a position away from an origin of the reading unit by a first distance in a width direction intersecting the transport direction, based on detection of the document by the document detection unit, the control unit starts reading by the reading unit, when a size of the document is not specified, the control unit performs first identification processing of identifying, for image data generated as a reading result by the reading unit, a region of the document by detecting an edge of the document, and when the size of the document is specified, the control unit performs second identification processing of searching the image data, at a position within a first range including the first position in the width direction, for a downstream end of the document from a downstream end of the image data toward upstream in the transport direction, and based on a position of the downstream end of the document identified by the searching, identifying as the region of the document a region corresponding to the size of the document specified.

Provided is an image reading method to be performed by an image reading device, the image reading device including a first transport roller configured to transport a document in a predetermined transport direction, a second transport roller provided downstream of the first transport roller in the transport direction and configured to transport the document in the transport direction, a reading unit provided downstream of the second transport roller and configured to read the document transported, and a document detection unit provided, in the transport direction, between a position where the first transport roller comes into contact with the document and a position where the second transport roller comes into contact with the document, the document detection unit being configured to detect the document, the document detection unit being located at a first position, the first position being a position away from an origin of the reading unit by a first distance in a width direction intersecting the transport direction, the image reading method including: based on detection of the document by the document detection unit, starting reading by the reading unit, when a size of the document is not specified, performing first identification processing of identifying, for image data generated as a reading result by the reading unit, a region of the document by detecting an edge of the document, and when the size of the document is specified, performing second identification processing of searching the image data, at a position within a first range including the first position in the width direction, for a downstream end of the document from a downstream end of the image data toward upstream in the transport direction, and based on a position of the downstream end of the document identified by the searching, identifying as the region of the document a region corresponding to the size of the document specified.

DESCRIPTION OF EMBODIMENTS

An embodiment of the present disclosure will be described below with reference to the drawings. Note that each of the drawings is merely illustrative for describing the embodiment. Since the drawings are illustrative, proportions, shapes, and shading may not be precise, consistent, or may be partially omitted.

1. Overall Description of Device Configuration

Figure 1:
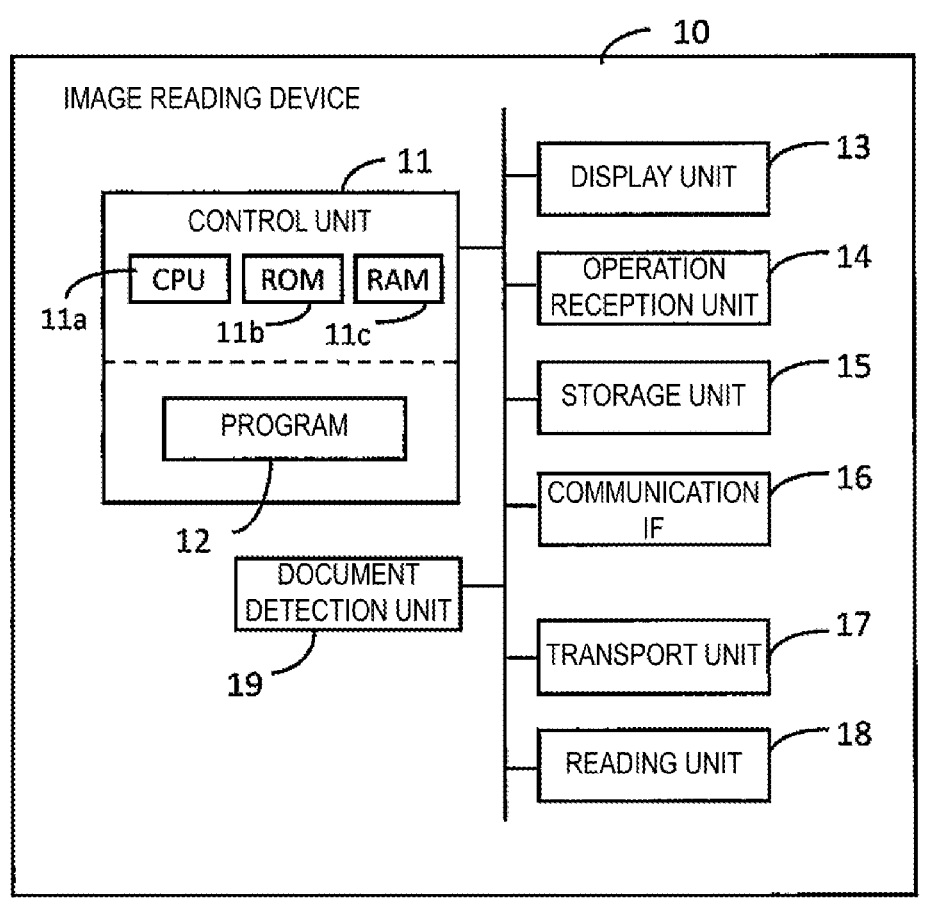
FIG. 1 is a diagram illustrating a device configuration in a simplified manner.

FIG. 1 illustrates a configuration of an image reading device 10 according to an embodiment in a simplified manner. The image reading device 10 performs an image reading method. The image reading device 10 is a sheet-feed type scanner, and includes a control unit 11, a display unit 13, an operation reception unit 14, a storage unit 15, a communication IF 16, a transport unit 17, a reading unit 18, a document detection unit 19, and the like. The document detection unit 19 is, for example, an optical sensor. IF is an abbreviation for interface. The control unit 11 includes one or more ICs including a CPU 11a as a processor, a ROM 11b, a RAM 11c, and the like, and another non-volatile memory, and the like.

In the control unit 11, the processor, that is, the CPU 11a executes arithmetic processing in accordance with a program 12 stored in the ROM 11b, the other memory, or the like, using the RAM 11c or the like as a work area, to realize processing according to the embodiment. The processor is not limited to a single CPU, and a configuration may be adopted in which the processing is executed by a hardware circuit such as a plurality of CPUs, an ASIC, or the like, or a configuration may be adopted in which the CPU and the hardware circuit work in concert to execute the processing.

The display unit 13 is a unit that displays visual information, and is constituted, for example, by a liquid crystal display, an organic EL display, or the like. The display unit 13 may include a display and a drive circuit for driving the display.

The operation reception unit 14 is a unit that receives an operation or an input by a user, and is realized, for example, by a physical button, a touch panel, a mouse, a keyboard, or the like. The operation reception unit 14 as a touch panel may be realized as a function of the display unit 13.

The display unit 13 and the operation reception unit 14 may be peripheral devices externally coupled to the image reading device 10.

For example, the storage unit 15 is a storage unit such as a hard disk drive, a solid state drive, and another memory. A portion of the memory included in the control unit 11 may be regarded as the storage unit 15. The storage unit 15 may be regarded as a portion of the control unit 11.

The communication IF 16 is a generic term for one or a plurality of IFs for establishing communication with an external device (not illustrated) in a wired or wireless manner, in accordance with a prescribed communication protocol including a known communication standard. For example, the external device is a terminal such as a personal computer, a server, a smartphone, and a tablet type terminal.

The transport unit 17 is a unit that transports a document, which is an object to be read, along a predetermined transport path. For example, the transport unit 17 includes a roller that rotates to transport a document, a motor as a driving source for rotation, and the like. The transport unit 17 also includes a so-called auto document feeder (ADF) function capable of sequentially transporting a plurality of documents one sheet at a time, which are placed on a document tray.

The reading unit 18 is a unit that optically reads a document transported by the transport unit 17. The reading unit 18 includes a general configuration as a scanner, including a light source that irradiates a document, an image sensor that receives reflected light or transmitted light from a document, converts the light photoelectrically to generate an electrical signal as a result of reading, and outputs the electrical signal, an analog front end that converts the output from the image sensor to a digital signal to obtain image data, and the like. The image sensor of the reading unit 18 is a line sensor including a plurality of imaging elements arranged side by side along a width direction D2 intersecting a transport direction D1 described later, and reads an image of one line elongated in the width direction D2 in one reading operation. The intersection between the transport direction D1 and the width direction D2 may be regarded as orthogonal intersection or substantially orthogonal intersection. The reading unit 18 obtains two-dimensional image data by repeatedly reading an image of one line at a predetermined frequency. The width direction D2 may be referred to as a main scanning direction, and the transport direction D1 may be referred to as a sub-scanning direction.

Figure 2:
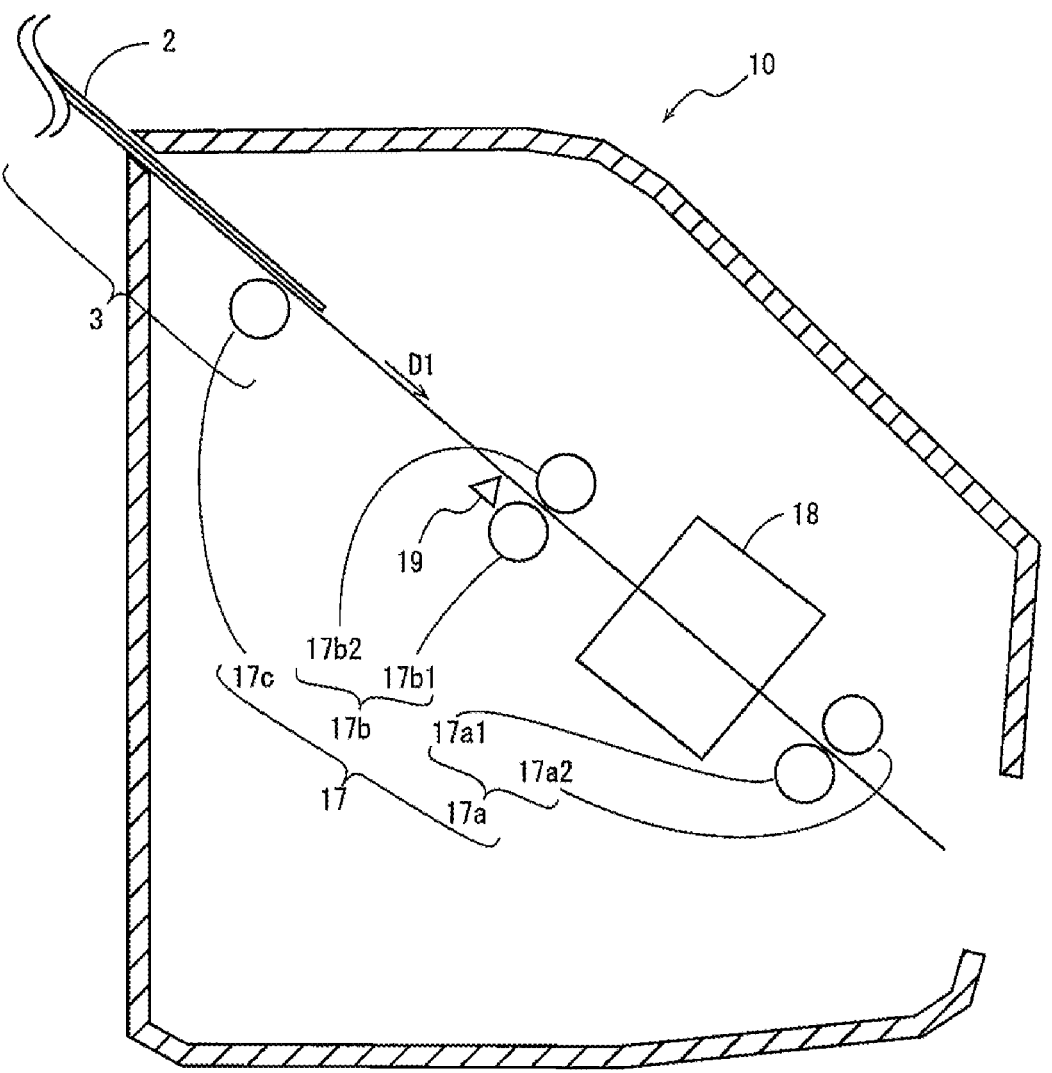
FIG. 2 is a diagram illustrating an internal configuration of an image reading device from a side viewpoint in a simplified manner.

FIG. 2 mainly illustrates an internal configuration of image reading device 10 from a side viewpoint in a simplified manner. The image reading device 10 includes a placement unit 3 on which a document 2 is placed. The placement unit 3 is a document tray. The transport unit 17 transports the document 2 placed on the placement unit 3 in a predetermined transport path. The transport unit 17 includes a load roller 17c, a transport roller pair 17b including rollers 17b1 and 17b2 that are disposed to face each other with the transport path therebetween and a sheet discharging roller pair 17a including rollers 17a1 and 17a2 that are similarly disposed to face each other. For example, the load roller 17c, the roller 17b1 and the roller 17a1 that are disposed on a lower side of the transport path are coupled to a motor (not illustrated), and are rotated by driving force applied from the motor.

A direction along the transport path is referred to as the transport direction D1. The transport unit 17 transports the document 2 in the transport direction D1. Upstream and downstream in the transport direction D1 are simply referred to as upstream and downstream. The transport roller pair 17b is disposed upstream of the reading unit 18, and transports the document 2 downstream. The sheet discharging roller pair 17a is disposed downstream of the reading unit 18, and transports the document 2 read by the reading unit 18 downstream to discharge the document 2. The load roller 17*c* is disposed upstream of the transport roller pair 17*b* at a position closer to the placement unit 3. The load roller 17*c* draws out the document 2 one sheet at a time, from the placement unit 3 into the transport path.

The load roller 17*c* corresponds to an example of a "first transport roller" that transports the document 2 in the transport direction D1. As a matter of course, the load roller 17*c* may also be a roller pair in reality in which rollers face each other so as to sandwich the transport path. The transport roller pair 17*b* and the rollers 17*b*1 and 17*b*2 constituting the transport roller pair 17*b* correspond to examples of a "second transport roller" that is provided downstream of the first transport roller and transports the document 2 in the transport direction D1.

The document detection unit 19 that detects the document 2 is disposed downstream of the load roller 17*c* and upstream of the transport roller pair 17*b*. Specifically, the document detection unit 19 is provided between a position where the load roller 17*c* comes into contact with the document 2 and a position where the transport roller pair 17*b* comes into contact with the document 2 in the transport direction D1. The position where the transport roller pair 17*b* comes into contact with the document 2 is a position where the transport roller pair 17*b* sandwiches the document 2. The document detection unit 19 outputs an on signal meaning presence of the document in a state in which the document 2 can be detected, and outputs an off signal meaning absence of the document in a state in which the document 2 cannot be detected.

In the example illustrated in FIG. 2, the reading units 18 is provided on an upper side and a lower side of the transport path to sandwich the transport path therebetween, and is capable of reading both surfaces of the document 2 at the same time. In other words, the reading unit 18 reads an upper surface of the document 2 with an image sensor provided on the upper side of the transport path, and reads a lower surface of the document 2 with an image sensor provided on the lower side of the transport path. However, it is not necessarily required that the image reading device 10 be a product capable of reading both the surfaces of the document 2 at the same time. For example, the image reading device 10 may be a product in which the reading unit 18 reads a downward facing surface of the document 2 transported with the image sensor provided on the lower side of the transport path, the transport unit 17 causes the document 2 to make a U-turn, eventually allowing the reading unit 18 to read both the surfaces of the document 2. Alternatively, the image reading device 10 may be a product capable of reading only one surface of both the surfaces of the document 2.

Figure 3:
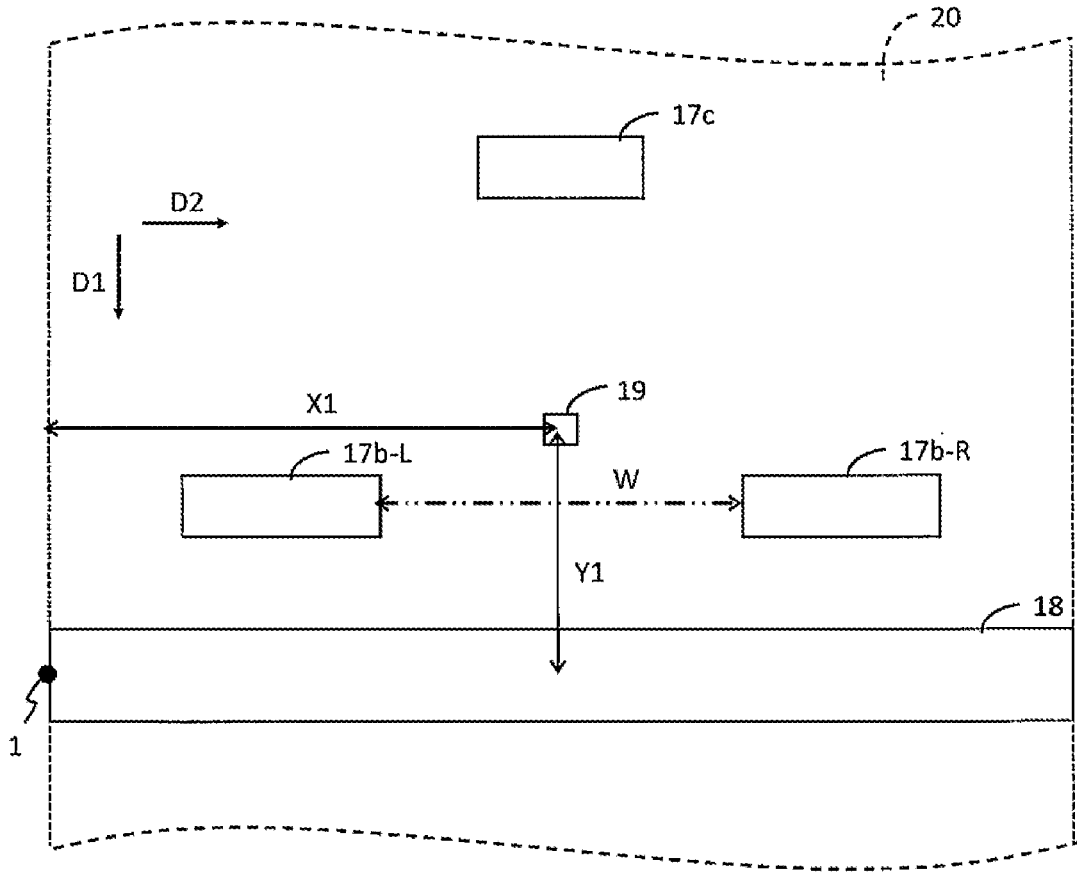
FIG. 3 is a diagram illustrating a disposition of a load roller, a transport roller pair, a reading unit, and the like in a simplified manner.

FIG. 3 illustrates a disposition of components such as the load roller 17*c*, the transport roller pair 17*b* and the reading unit 18 from a viewpoint from above orthogonal to the transport direction D1 and the width direction D2 in a simplified manner. In FIG. 3, a part of a transport path 20 along which the document 2 is transported by the transport unit 17 is indicated by broken lines in a simplified manner. Note that FIG. 2 can be said to be a diagram from a viewpoint facing the width direction D2. Reference signs 17*b*-L and 17*b*-R in FIG. 3 each indicate the transport roller pair 17*b*. That is, in the example of FIG. 3, the transport roller pairs 17*b* are disposed at least at two positions with an interval therebetween in the width direction D2. The transport roller pair 17*b*-L is an example of rollers on one side disposed with an interval therebetween in the width direction D2 as the second transport rollers, and the transport roller pair 17*b*-R is an example of rollers on another side disposed with an interval therebetween in the width direction D2 as the second transport rollers. It may be understood that the transport roller pair 17*b*-L and the transport roller pair 17*b*-R are disposed symmetrically with a center position in the width direction D2 interposed therebetween in the transport path 20. The transport roller pair 17*b* illustrated in FIG. 2 corresponds to the transport roller pair 17*b*-L.

The document detection unit 19 is located at a "first position" that is a position of a first distance X1 from an origin 1 of the reading unit 18 in the width direction D2. The first position is almost at or near the center position in the width direction D2 in the transport path 20. In the example of FIG. 3, the origin 1 of the reading unit 18 is one end position in the width direction D2 of the reading unit 18, but it is sufficient that the origin 1 is any reference point determined in the image reading device 10. In any case, the document detection unit 19 is located at the first position that is the position of the first distance X1 from the origin 1 in the width direction D2, and as a result, is at or near the center position in the width direction D2 in the transport path 20.

Further, when the first position is defined, the first position is included in a "first range" in the width direction D2. In FIG. 3, the first range is indicated by a range W. The range W corresponds to a gap between the transport roller pair 17*b*-L and the transport roller pair 17*b*-R in the width direction D2. Although the first range may be the entire range W or may be a part of the range W, in any case, the first range is a range including the first position in the width direction D2.

In FIG. 3, a distance between the document detection unit 19 and a reading position by the reading unit 18 in the transport direction D1 is indicated as a second distance Y1.

2. Image Reading Processing

Figure 4:
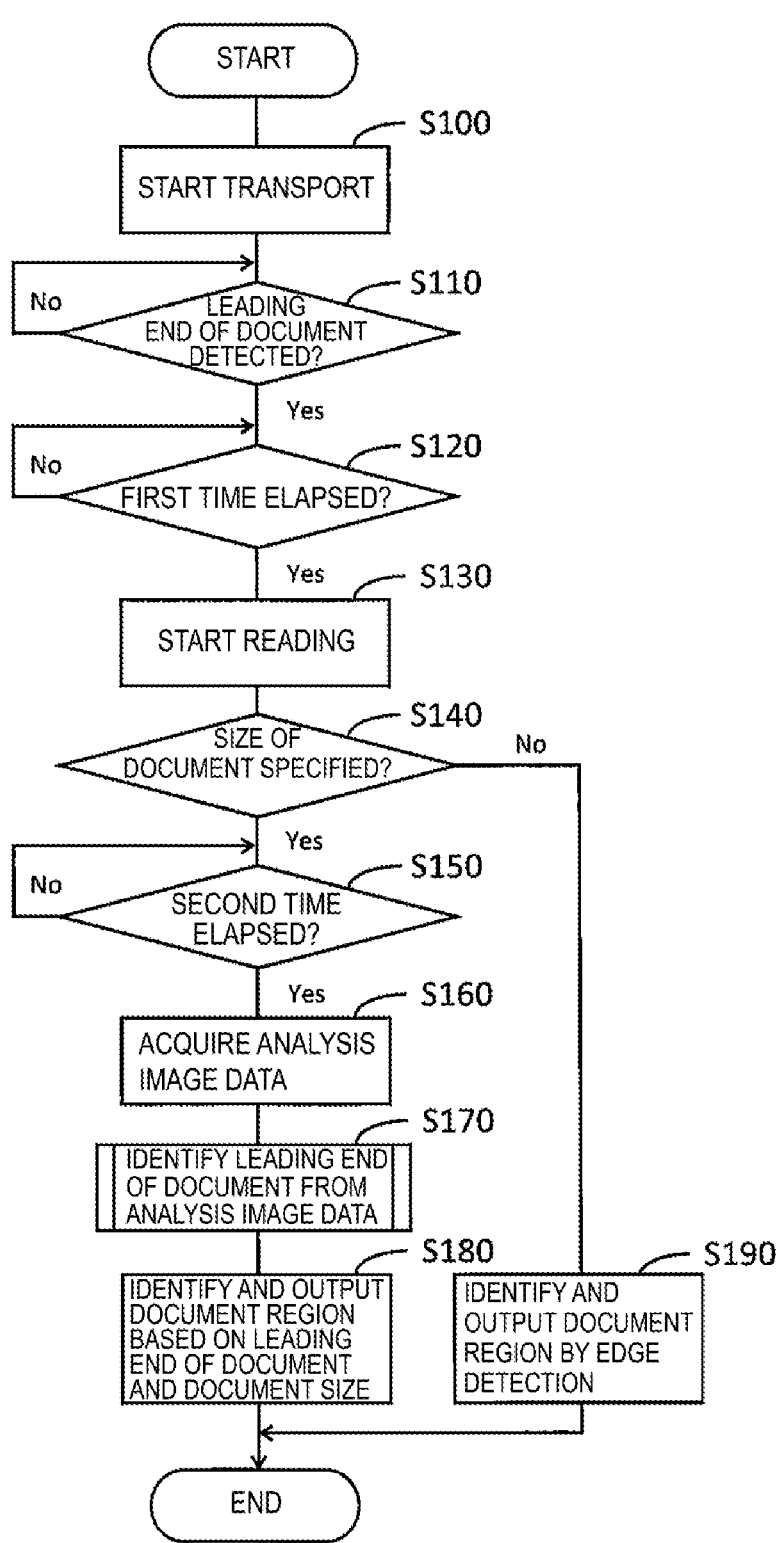
FIG. 4 is a flowchart illustrating image reading processing.

FIG. 4 illustrates, by a flowchart, image reading processing that the control unit 11 performs in accordance with the program 12. Description of the flowchart serves as description of the image reading method.

The user operates the operation reception unit 14 or the external device to instruct the image reading device 10 to start scanning of the document 2. In step S100, upon receiving the scan start instruction, the control unit 11 causes the transport unit 17 to start processing of transporting one document 2 from the placement unit 3.

In step S110, the control unit 11 continuously determines whether a leading end, which is a downstream end of the document 2, is detected by the document detection unit 19. In the embodiment, with respect to the document 2, image data as a reading result, or a portion thereof, a downstream end is referred to as a "leading end", and an upstream end is referred to as a "trailing end". When the leading end of the document 2 reaches the document detection unit 19, the document detection unit 19 switches output from an off signal so far to an on signal. When the output from the document detection unit 19 is switched from the off signal to the on signal after the start of transport in step S100, the control unit 11 may determine "Yes" in step S110 and proceed to step S120.

In step S120, the control unit 11 determines whether a "first time" has elapsed since the document 2 is detected by the document detection unit 19, that is, since "Yes" is determined in step S110, and when the first time has elapsed, determines "Yes" in step S120 and proceeds to step S130. The first time is a predetermined time shorter than a "prescribed time" required for the transport unit 17 to transport the document 2 from the document detection unit 19 to the reading unit 18. A distance from the document detection unit 19 to the reading unit 18 may be regarded as the second distance Y1 illustrated in FIG. 3. The time required for transport by the second distance Y1 is known in design, and is referred to as the prescribed time.

An error may occur in the transport using each roller by the transport unit 17. For this reason, when the prescribed time elapses from the time point at which "Yes" is determined in step S110, the leading end of the document 2 does not necessarily advance downstream accurately by the second distance Y1 from the document detection unit 19. However, by defining the first time shorter than the prescribed time in advance, and using the first time for the determination in step S120, it is possible to realize a state in which the leading end of the document 2 does not reach the reading unit 18 at the time point when "Yes" is determined in step S120. The first time is, for example, a time during which the leading end of the document 2 does not reach the transport roller pairs 17*b*-L and 17*b*-R or reaches the transport roller pairs 17*b*-L and 17*b*-R after passing through the document detection unit 19. Furthermore, for example, the first time may be 0.

In step S130, the control unit 11 causes the reading unit 18 to start reading.

In step S140, it is determined whether a size of the document 2 is specified. When instructing the image reading device 10 to start scanning of the document 2, the user can additionally specify the size of the document 2. For example, the user can operate the operation reception unit 14 to specify any standard size such as "A4", "B5", or "post card" as the size of the document 2 on a UI screen displayed on the display unit 13. UI is an abbreviation for user interface.

On the other hand, the user can also instruct the image reading device 10 to start scanning without specifying the size of the document 2. For example, the user operates the operation reception unit 14 to specify an option "automatic" as the document size on the UI screen. "Automatic" means that the image reading device 10 is caused to automatically detect the document size, and corresponds to a case where the user does not specify the document size. Therefore, when the user specifies "automatic" in advance, the control unit 11 determines "No" in Step S140, and proceeds to Step S190. On the other hand, when any standard size is specified in advance by the user, it is determined as "Yes" in step S140, and the processing proceeds to step S150.

Step S190 includes "first identification processing". On the other hand, steps S150 to S180 include "second identification processing". Therefore, step S140 is determination for branching to the first identification processing or the second identification processing.

First, the second identification processing will be described. In step S150, the control unit 11 determines whether a "second time" has elapsed since the document 2 is detected by the document detection unit 19, that is, since the determination of "Yes" in step S110, and when the second time has elapsed, the control unit 11 determines "Yes" in step S150 and proceeds to step S160. The second time is a predetermined time longer than the above-described prescribed time. By defining the second time longer than the prescribed time in advance and using the second time for the determination in step S150, it is possible to realize a state in which a part of the document 2 including the leading end of the document 2 is already read by the reading unit 18 at the time point when "Yes" is determined in step S150. However, the second time is a predetermined time shorter than a time required for the trailing end of the document 2 to be transported to the reading unit 18 after the leading end of the document 2 is detected by the document detection unit 19. Therefore, at the time point when "Yes" is determined in step S150, the document 2 is read halfway by the reading unit 18.

In step S160, the control unit 11 acquires image date generated since the reading unit 18 starts the reading in step S130 until the current time as analysis image data. As can be seen from the above description, the analysis image data is image data generated by reading during a period from when the reading unit 18 starts the reading in step S130 until when "the second time minus the first time" elapses. Needless to say, even after "Yes" in Step S150, the control unit 11 causes the transport of the document 2 by the transport unit 17 and the reading by the reading unit 18 to continue.

In step S170, the control unit 11 identifies the leading end of the document 2 using the analysis image data acquired in step S160. The analysis image data may be the image data generated by the reading unit 18 as is, but the control unit 11 may binarize the analysis image data so that the leading end of the document 2 is easily searched for. Specifically, the control unit 11 binarizes each pixel constituting the analysis image data by converting a pixel in a color of a so-called background plate into a black pixel and converting a pixel in a color other than the color of the background plate into a white pixel. The background plate is provided as a background of the document 2 so as to face the reading unit 18 in the transport path, and the reading unit 18 reads the background plate outside the document 2. Since the color of the background plate is known, it is sufficient that the control unit 11 converts a pixel in a predetermined color gamut that can be determined to correspond to the color of the background plate into the black pixel, and converts a pixel in other color into the white pixel. As a result, a region corresponding to the reading result of the document 2 in the analysis image data becomes the white pixels.

Figure 5:
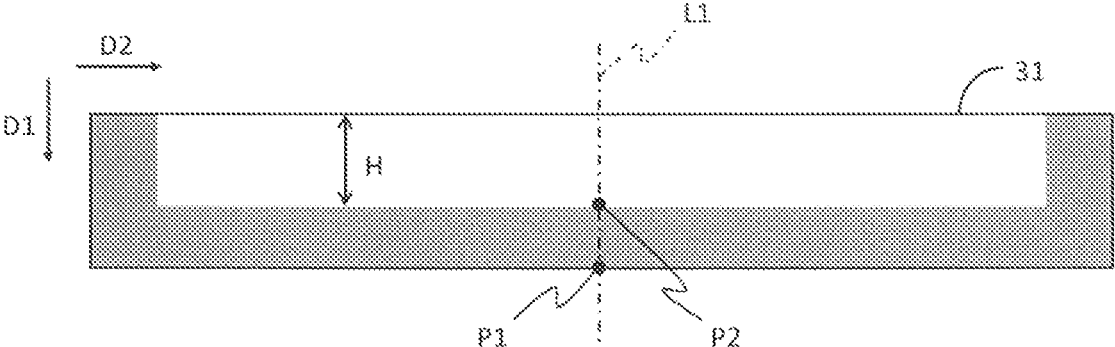
FIG. 5 is a diagram illustrating an example of analysis image data.

FIG. 5 illustrates an example of analysis image data 31. In FIG. 5, a correspondence relationship among the directions D1 and D2 and an orientation of the analysis image data 31 is also illustrated. In the analysis image data 31, a gray region is a region in which the above-described black pixels are aggregated, and a white region is a region in which the above-described white pixels are aggregated. In step S170, the control unit 11 searches from a leading end of the image data toward upstream for the leading end of the document 2 at a position within the first range including the first position in the width direction D2. The position at which the searching is performed within the first range is hereinafter also referred to as a "search position". Although the search position may be the first position or may be shifted from the first position in the width direction D2, the search position is assumed to be the first position in the example of FIG. 5.

A search line L1 indicated by a one dot chain line in FIG. 5 indicates a position corresponding to the first position in the image generated by the reading. The first position and the first range including the first position are a position and a range that are predetermined in the image reading device 10 as an object, but, in the description related to the image data, a position corresponding to the first position and a range corresponding to the first range in the image data are also simply referred to as the first position and the first range.

Figure 6:
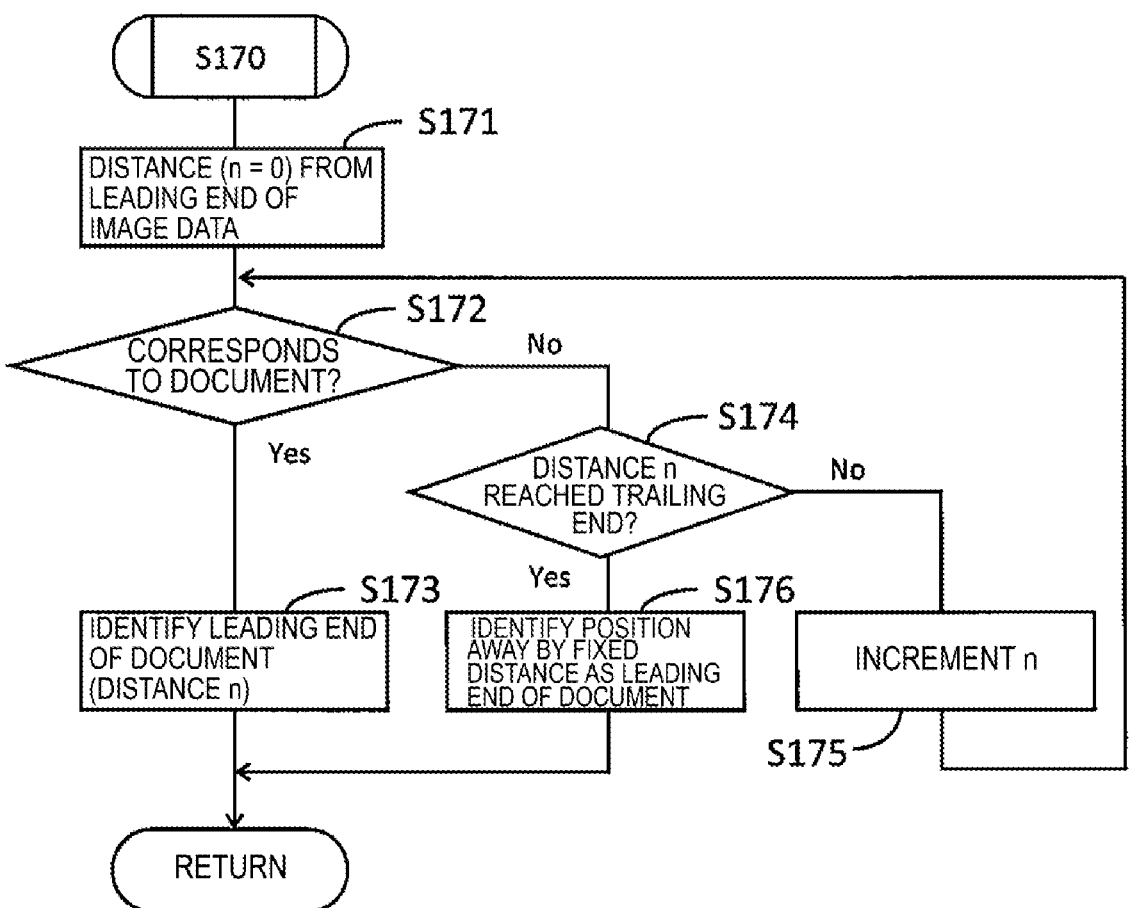
FIG. 6 is a flowchart illustrating details of step S170.

FIG. 6 illustrates, by a flowchart, details of step S170.

In step S171, the control unit 11 sets a pixel P1 that is a pixel at a position passing through the search line L1 in the analysis image data 31 and is a leading end of the analysis image data 31 as a search start position, and sets a distance n from the leading end of the analysis image data 31 to 0. Refer to FIG. 5 for the pixel P1.

In step S172, the control unit 11 determines whether a pixel at a position of the distance n corresponds to the document 2. According to the above-described example, since the pixel corresponding to the document 2 is the white pixel in the analysis image data 31, the control unit 11 determines "Yes" when the pixel at the position of the distance n is the white pixel, and determines "No" when the pixel is the black pixel. From "Yes" in step S172, the processing proceeds to step S173, and from "No" in step S172, the processing proceeds to step S174.

In step S174, the control unit 11 determines whether the distance n has reached a trailing end of the analysis image data 31, and when the distance n has reached the trailing end of the analysis image data 31, the control unit 11 determines "Yes" and proceeds to step S176. When the distance n reaches the trailing end of the analysis image data 31, the leading end of the document 2 cannot be searched for any more. On the other hand, when the distance n does not reach the trailing end of the analysis image data 31, the processing proceeds from the determination of "No" in step S174 to step S175.

In step S175, the control unit 11 increments the distance n. That is, 1 is added to the current distance n to update the distance n. A unit of a distance n is pixel. As a result of step S175, the distance n is increased by one pixel toward upstream along the search line. After step S175, the control unit 11 repeats step S172 and subsequent steps.

In step S173, the control unit 11 identifies the pixel at the position of the distance n as the leading end of the document 2. In the example of FIG. 5, as a result of searching for the leading end of the document 2 from the pixel P1 toward upstream along the search line L1, the pixel P2 at a position where the black pixel is switched to the white pixel is identified as the leading end of the document 2.

Step S176 corresponds to a case where the searching fails to identify the leading end of the document 2. In this case, the control unit 11 identifies a position of a fixed distance set in advance from the pixel P1 toward upstream as the leading end of the document 2. The fixed distance is a distance corresponding to a transport time in design from when the reading unit 18 starts the reading in step S130 to when the leading end of the document 2 reaches the reading unit 18. For example, when a color of the document 2 happens to be the same as or similar to the color of the background plate, the processing proceeds from "Yes" in step S174 to step S176 in some cases. The control unit 11 ends step S170 via step S173 or step S176, and proceeds to step S180.

In step S180, based on a position of the leading end of the document 2 identified in step S170, the control unit 11 identifies a region corresponding to the size of the document 2 specified by the user as described above (hereinafter referred to as a specified size) as a document region, and outputs the document region. That is, the control unit 11 identifies a region upstream of the leading end of the document 2 and corresponding to the specified size as a document region, with the image data generated by the reading unit 18 as a target, and outputs image data of the document region. The output mentioned here is, for example, storage in the storage unit 15 or another memory inside or outside the image reading device 10, transfer to an external device via the communication IF 16, printing by a printing apparatus (not illustrated), or the like. After step S180 or step S190, the flowchart of FIG. 4 ends.

Figure 7:
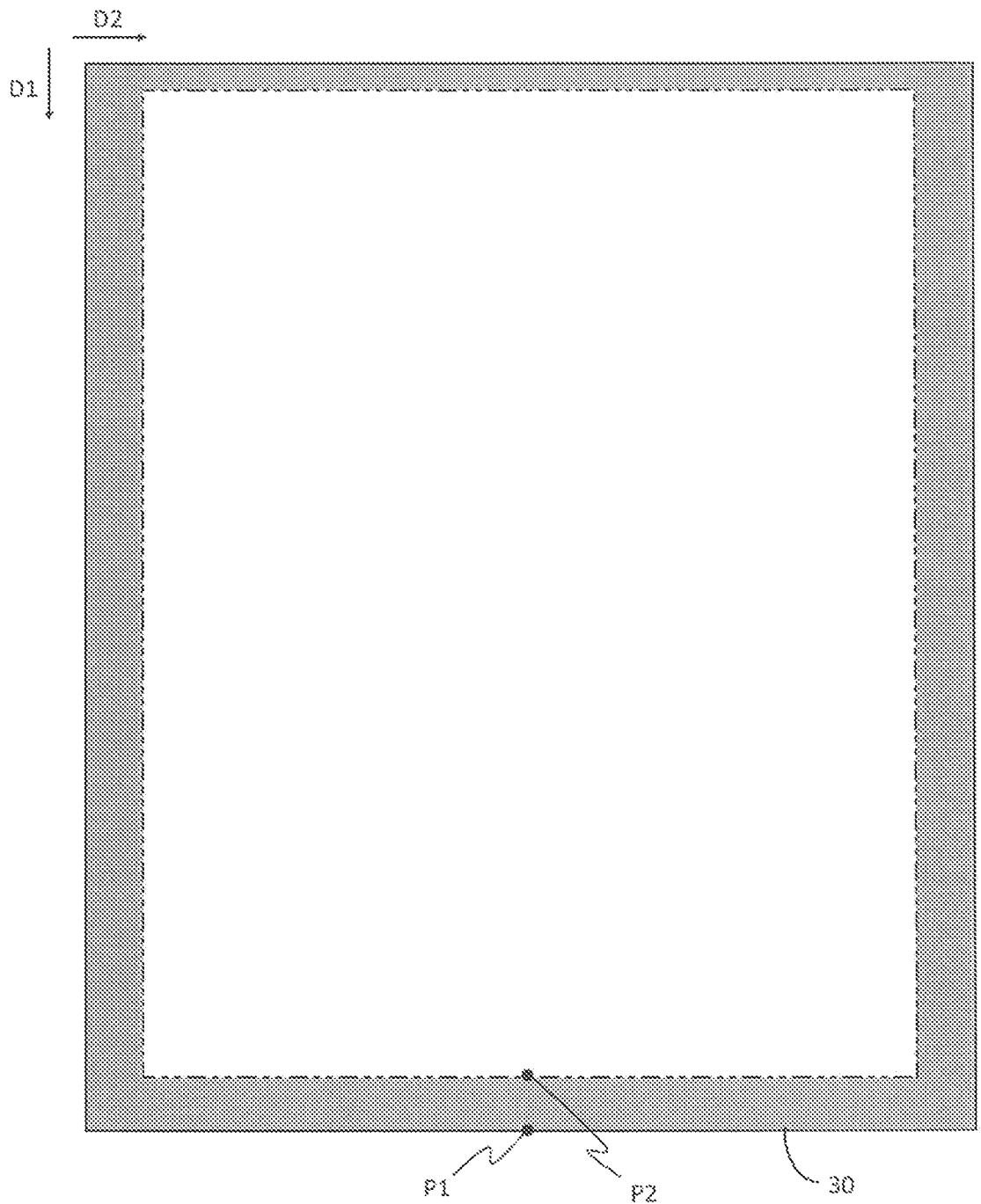
FIG. 7 is a diagram illustrating an example of image data.

FIG. 7 illustrates an example of image data 30 to be processed in step S180. The image data 30 is image data that is obtained as a result of the reading by the reading unit 18 started in step S130 and includes one page of the document 2. A way of viewing FIG. 7 is the same as the way of viewing FIG. 5. The analysis image data 31 can be regarded as a part of the image data 30. However, binarization is not performed for each pixel of the image data 30. The control unit 11 recognizes the specified size, that is, lengths of the document 2 in the transport direction D1 and the width direction D2. In addition, a position in the width direction D2 of the document 2 transported on the transport path is also generally known in terms of product standards. Therefore, it is sufficient that the control unit 11 identifies and cuts out, of the image data 30, a region including and upstream of the leading end of the document 2, for example, the pixel P2, and that is a rectangular region having the specified size, as the document region. In FIG. 7, the document region is indicated by a two dot chain line.

Although not particularly illustrated in the flowchart of FIG. 4, the control unit 11 naturally ends the transporting started by the transport unit 17 in step S100 and the reading started by the reading unit 18 in step S130 at appropriate timing. The control unit 11 ends the reading at timing at which the trailing end of the document 2 can be determined to pass through the reading unit 18. For example, it is sufficient that the control unit 11 ends the reading by the reading unit 18 at predetermined timing after the prescribed time elapses since the trailing end of the document 2 is detected by the document detection unit 19, that is, since the output of the document detection unit 19 is switched from the on signal to the off signal. Further, when the document 2 is discharged downstream in the transport path, the control unit 11 causes the transport unit 17 to end the transporting. Of course, when the next document 2 is placed on the placement unit 3, the control unit 11 causes the transport unit 17 to start transporting the next document 2.

A supplementary description will be given of step S180. In the examples of FIG. 5 and FIG. 7, the analysis image data 31 and the image data 30 each include regions in the color of the background plate on one end side and another end side in the width direction D2. However, when the control unit 11 recognizes the specified size, the control unit 11 need not cause the reading unit 18 to read the background plate on the one end side and the other end side in the width direction D2. For example, when the specified size is A4 size, the control unit 11 may enable reading only for a range corresponding to a width of A4 size, in a range of the image sensor of the reading unit 18 in the width direction D2 in the reading started in step S130. In this way, the analysis image data 31 or the image data 30 becomes image data that does not originally include a region in the color of the background plate on the one end side and the other end side in the width direction D2, and in step S180, it is sufficient that cutting is performed only upstream and downstream of the image data 30.

The first identification processing is well known, and thus will be briefly described. In step S190, the control unit 11 detects an edge of the document 2 in the image data generated as the result of the reading by the reading unit 18 from step S130 to identify a region of the document and outputs the region. The meaning of the output is as described above. In a situation where the size of the document 2 is not specified, the control unit 11 basically enables the entire range of the image sensor of the reading unit 18 in the width direction D2 and causes reading to be performed. Edge detection is performed on image data including one page of the document 2 generated as a result of such reading. In general, an edge of an image is a position at which color or brightness suddenly changes. In the image data, pixels at positions at which the color of the background plate changes to the color of the document 2 itself form the edge partitioning an inside and an outside of the document region. Since an edge detection method is known, a detailed description thereof is omitted here. As a result of the edge detection, four linear edges are detected, and it is sufficient that the control unit 11 identifies and cuts out a rectangle surrounded by the four linear edges as the document region.

3. Conclusion

As described above, according to the embodiment, the image reading device 10 includes: the first transport roller that transports the document 2 in the predetermined transport direction D1; the second transport roller that is provided downstream of the first transport roller in the transport direction D1 and transports the document 2 in the transport direction D1; the reading unit 18 that is provided downstream of the second transport roller and reads the document 2 transported; the document detection unit 19 that is provided between a position where the first transport roller comes into contact with the document 2 and a position where the second transport roller comes into contact with the document 2 in the transport direction D1, and detects the document 2; and the control unit 11. The document detection unit 19 is located at the first position that is the position of the first distance from the origin of the reading unit 18 in the width direction D2 intersecting the transport direction D1. The control unit 11 starts reading by the reading unit 18 based on detection of the document 2 by the document detection unit 19. When the size of the document is not specified, the control unit 11 performs the first identification processing of identifying, for the image data generated as the reading result by the reading unit 18, the region of the document 2 by detecting the edge of the document 2, and when the size of the document 2 is specified, the control unit 11 performs the second identification processing of searching the image data, at a position within the first range including the first position in the width direction D2, for the downstream end of the document 2 from the downstream end of the image data toward upstream in the transport direction D1, and based on the position of the downstream end of the document 2 identified by the searching, identifying as the region of the document 2 a region corresponding to the size of the document 2 specified.

According to the above-described configuration, when performing reading in the state in which the size of the document 2 is specified, the control unit 11 searches for and identifies the leading end of the document 2 from downstream to upstream at the search position within the first range including the first position in the image data. Therefore, even when the document detection unit 19 is disposed upstream of the second transport roller, it is possible to appropriately identify the leading end of the document 2 in the image data and obtain an image without loss of the leading end.

In addition, according to the embodiment, the second transport roller includes the roller on the one side and the roller on the other side which are disposed with an interval therebetween in the width direction D2, and the first range may be included between the roller on the one side and the roller on the other side.

According to the above-described configuration, the first range is a range including the center in the width direction D2, and the control unit 11 searches for the leading end of the document 2 at a search position included in this range. Therefore, it is possible to appropriately identify the leading end of the document 2 in the image data and obtain an image as a reading result without loss of the leading end.

Additionally, according to the embodiment, in the second identification processing, the control unit 11 may search the image data for the downstream end of the document 2 at the first position.

According to the above-described configuration, the leading end of the document 2 is searched for at the first position which is a position of the document detection unit 19 in the width direction D2, thus the leading end of the document 2 can be accurately identified in the image data.

In addition, according to the embodiment, with the predetermined time shorter than the prescribed time required to transport the document 2 from the document detection unit 19 to the reading unit 18 defined as the first time, and with the predetermined time longer than the prescribed time defined as the second time, the control unit 11 may start reading by the reading unit 18 at timing at which the first time elapses since the document 2 is detected by the document detection unit 19, and in the second identification processing, may search for the downstream end of the document 2 by using the image data generated by reading in the period from when the reading by the reading unit 18 is started to when the second time minus the first time elapses.

According to the above-described configuration, the image data that reliably includes the reading result of the leading end of the document 2 and has a reduced data amount is acquired as the analysis image data, and the searching for the leading end of the document 2 is performed. Therefore, it is possible to suppress memory consumption required for the analysis image data.

However, the analysis image data may be image data of a size including one page of the document 2.

As one example, the second time may be a time having a length that permits reading from the downstream end of the document 2 to a position upstream of the downstream end by 40 mm to 50 mm. That is, the second time is a time having a length such that a distance H from the leading end of the document 2 to the trailing end of the analysis image data 31 in the transport direction D1, as illustrated in the analysis image data 31 of FIG. 5, is secured to be about from 40 mm to 50 mm in terms of millimeters.

Additionally, according to the embodiment, when the searching fails to identify the downstream end of the document 2 in the second identification processing, the control unit 11 may identify a position of a fixed distance set in advance from the downstream end of the image data toward upstream as the downstream end of the document 2.

According to the above-described configuration, even when the searching fails to identify the leading end of the document 2 due to the color of the document 2 in the image data, it is possible to identify the leading end of the document 2 by using the fixed distance as a substitute, and identify the region of the document 2.

According to the examples of FIGS. 2 and 3, a sensor capable of detecting the document 2 is not disposed at a position downstream of the transport roller pair 17*b* and upstream of the reading unit 18.

In addition to the document detection unit 19, a sensor capable of detecting the document 2 may be disposed at a position downstream of the transport roller pair 17*b* and upstream of the reading unit 18, but this sensor is not used at least in the processing described in the embodiment.

In the scope of the claims, only some of the combinations of the claims are described. However, as a matter of course, the embodiment includes various combinations of the plurality of dependent claims, as well as one-to-one combinations of the independent claims and the dependent claims.

In addition to the image reading device 10, the embodiment discloses the image reading method and the program 12 for executing the image reading method in collaboration with the processor.

That is, in the image reading method to be performed by the image reading device 10, the image reading device 10 including the first transport roller that transports the document 2 in the predetermined transport direction D1, the second transport roller that is provided downstream of the first transport roller in the transport direction D1 and transports the document 2 in the transport direction D1, the reading unit 18 that is provided downstream of the second transport roller and reads the document 2 transported, and the document detection unit 19 that is provided, in the transport direction D1, between a position where the first transport roller comes into contact with the document 2 and a position where the second transport roller comes into contact with the document 2, and detects the document 2, the document detection unit 19 is located at the first position, the first position being the position away from the origin of the reading unit 18 by the first distance in the width direction D2 intersecting the transport direction D1, and the image reading method includes: based on detection of the document 2 by the document detection unit 19, starting reading by the reading unit 18; when the size of the document 2 is not specified, performing the first identification processing of identifying, for the image data generated as a reading result by the reading unit 18, the region of the document 2 by detecting the edge of the document 2; and when the size of the document 2 is specified, performing the second identification processing of searching the image data, at a position within the first range including the first position in the width direction D2, for the downstream end of the document 2 from the downstream end of the image data toward upstream in the transport direction D1, and based on a position of the downstream end of the document 2 identified by the searching, identifying as the region of the document 2 the region corresponding to the size of the document 2 specified.

4. First Modified Example

Several modified examples included in the embodiment will be described.

According to a first modified example, in the second identification processing, in a case in which the control unit 11 searches for the downstream end of the document 2 from the downstream end of the image data toward upstream, when a predetermined number of consecutive pixels correspond to the color of the document 2, the control unit 11 identifies a position of a pixel farthest downstream of the predetermined number of consecutive pixels corresponding to the color of the document 2 as the downstream end of the document 2.

For example, the predetermined number is four. In this case, when determining in step S172 that a pixel at the position of the distance n corresponds to the document 2 for four consecutive pixels, the control unit 11 proceeds from step S172 to step S173. In other words, not only when it is determined in step S172 that the pixel at the position of the distance n does not correspond to the document 2, but also when it is determined once that the pixel at the position of the distance n corresponds to the document 2, when it is determined that the pixel corresponds to the document 2 for two consecutive pixels, or when it is determined that the pixel corresponds to the document 2 for three consecutive pixels, the processing proceeds to step S174. Then, in step S173, the control unit 11 identifies the position of the pixel farthest downstream of the predetermined number of consecutive pixels determined to correspond to the document 2 as described above as the leading end of the document 2.

According to such a first modified example, when dust is included in a region where the reading unit 18 reads the background plate, it is possible to avoid a situation in which the dust is erroneously recognized as the document 2 and the leading end of the document 2 is identified, thereby improving accuracy of identifying the leading end of the document. The user can optionally set the predetermined number in the first modified example in consideration of a size of dust and the like. In addition, the first modified example can be combined with any of modified examples described later.

5. Second Modified Example

In the second identification processing, the control unit 11 searches the image data for the downstream end of the document 2 at each of a plurality of positions within the first range, and identifies a position farthest downstream of downstream ends of the document 2 identified by the searching at each of the plurality of positions as the downstream end of the document 2.

Figure 8:
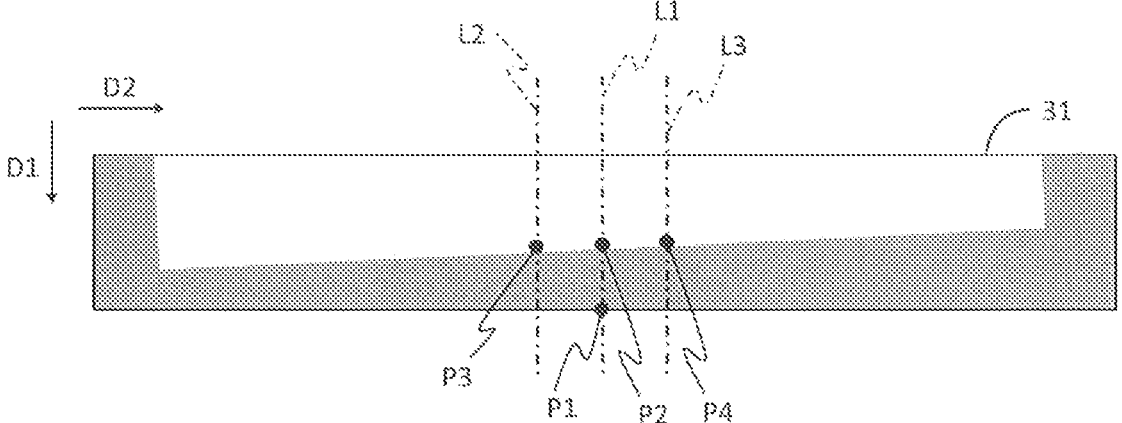
FIG. 8 is a diagram illustrating an example of analysis image data for explaining a second modified example.

FIG. 8 is a diagram for explaining a second modified example, and illustrates an example of the analysis image data 31. Since the way of viewing FIG. 8 is the same as the way of viewing FIG. 5, description common to FIG. 5 will be omitted. Each of the search lines L2 and L3 parallel to the search line L1 indicates a search position different from the search position by the search line L1 and within the first range. The control unit 11 performs the flowchart of FIG. 6 a plurality of times in the plurality of search lines L1, L2 and L3. As a result, in the example of FIG. 8, the pixel P3 is identified as the leading end of the document 2 by the searching in the search line L2, and the pixel P4 is identified as the leading end of the document 2 by the searching in the search line L3. In the example of FIG. 8, the control unit 11 identifies, as the leading end of the document 2, the pixel P3 that is farthest downstream of the pixels P2, P3, and P4, which are the leading ends of the document 2 identified by the searching in each of the search lines L1, L2, and L3.

According to such a second modified example, by searching for the leading end of the document 2 at each of the plurality of positions within the first range, it is possible to increase a possibility that the leading end of the document 2 can be identified. In addition, in the example of FIG. 8, it can be seen that the region corresponding to the document 2 is inclined in the analysis image data 31. In the second modified example, by identifying the position farthest downstream of the leading ends of the document 2 identified by the searching at each of the plurality of positions as the leading end of the document 2, it is possible to prevent an actual image of a leading end of a document from being lost as much as possible in image data of a document region to be output. In the second modified example, it is sufficient that when all of the searches at the plurality of positions fail to identify the leading end of the document 2, the fixed distance described above is adopted to identify the leading end of the document 2.

6. Third Modified Example

The control unit 11 searches the image data for the downstream end of the document 2 at the first position, and when the searching at the first position fails to identify the downstream end of the document 2, searches for the downstream end of the document 2 at a second position within the first range and different from the first position. That is, in the third modified example, searching is performed at one position in the first range, and when the searching fails, searching is performed at another position in the first range. Unlike the second modified example, the third modified example does not assume that the leading end of the document 2 is searched for at a plurality of positions within the first range, therefore, the processing of step S170 is more likely to end in a shorter time as compared to the second modified example.

FIG. 8 is also referred to as appropriate for the third modified example. When the control unit 11 performs the flowchart of FIG. 6 in the search line L1, and determines "Yes" in step S174, the control unit 11 suspends performance of step S176 and performs the flowchart of FIG. 6 again in the search line L2, for example. That is, a position of the search line L2 in the width direction D2 is a concrete example of the second position. If, "Yes" is determined in step S174 also when the flowchart of FIG. 6 is performed in the search line L2, it is sufficient to perform step S176.

Further, in the third modified example, the control unit 11 may search the image data for the downstream end of the document 2 at the second position, and when the searching at the second position fails to identify the downstream end of the document 2, the control unit 11 may search for the downstream end of the document 2 at a third position that is within the first range and on an opposite side of the second position with respect to the first position. FIG. 8 is also referred to here as appropriate. When the control unit 11 performs the flowchart of FIG. 6 in the search line L2 as described above, and determines "Yes" in step S174, the control unit 11 suspends performance of step S176 and performs the flowchart of FIG. 6 again in the search line L3. That is, a position of the search line L3 in the width direction D2 is a concrete example of the third position. If, "Yes" is determined in step S174 also when the flowchart of FIG. 6 is performed in the search line L3, it is sufficient to perform step S176.

According to such a third modified example, by searching for the leading end of the document 2 at one position in the first range, and, when the searching fails, performing searching at another position in the first range, it is possible to increase a possibility that the leading end of the document 2 can be identified.

What is claimed is:

1. An image reading device, comprising:
a first transport roller configured to transport a document in a predetermined transport direction;
a second transport roller provided downstream of the first transport roller in the transport direction and configured to transport the document in the transport direction;
a reading sensor provided downstream of the second transport roller and configured to read the document transported;
a document detection sensor provided, in the transport direction, between a position where the first transport roller comes into contact with the document and a position where the second transport roller comes into contact with the document, the document detection sensor being configured to detect the document; and
a control unit, wherein
the document detection sensor is located at a first position, the first position being a position away from an origin of the reading sensor by a first distance in a width direction intersecting the transport direction,
based on detection of the document by the document detection sensor, the control unit starts reading by the reading sensor,
when a size of the document is not specified, the control unit performs first identification processing of identifying, for image data generated as a reading result by the reading sensor and using a search line extending to a downstream end of the image data, a region of the document by detecting an edge of the document from the image data generated as the reading result by the reading sensor, and
when the size of the document is specified, the control unit performs second identification processing of searching the image data, at a position within a first range including the first position in the width direction, for a downstream end of the document from the downstream end of the image data toward upstream in the transport direction, and based on a position of the downstream end of the document identified by the searching, identifying as the region of the document a region corresponding to the size of the document specified, and
in the second identification processing, when the searching fails to identify the downstream end of the document from the image data, the control unit identifies a position away from the downstream end of the image data toward upstream by a fixed distance set in advance as a substitute for the downstream end of the document.

2. The image reading device according to claim 1, wherein
the second transport roller includes a roller on one side and a roller on the other side disposed spaced apart in the width direction and
the first range is included between the roller on the one side and the roller on the other side.

3. The image reading device according to claim 1, wherein
in the second identification processing, the control unit searches the image data for the downstream end of the document at the first position.

4. The image reading device according to claim 3, wherein
the control unit searches the image data for the downstream end of the document at the first position, and when the searching at the first position fails to identify the downstream end of the document, searches for the downstream end of the document at a second position within the first range, the second position being different from the first position.

5. The image reading device according to claim 4, wherein
the control unit searches the image data for the downstream end of the document at the second position, and when the searching at the second position fails to identify the downstream end of the document, searches for the downstream end of the document at a third position within the first range, the third position being on an opposite side of the second position with respect to the first position.

6. The image reading device according to claim 1, wherein
with a predetermined time shorter than a prescribed time required to transport the document from the document detection sensor to the reading sensor defined as a first time and

with a predetermined time longer than the prescribed time defined as a second time, the control unit starts reading by the reading sensor at a timing at which the first time elapses since the document is detected by the document detection sensor and in the second identification processing, the control unit searches for the downstream end of the document by using the image data generated by the reading in a period from when the reading by the reading sensor is started to when the second time minus the first time elapses.

7. The image reading device according to claim 6, wherein the second time is a time having a length that permits reading from the downstream end of the document to a position upstream of the downstream end by 40 mm to 50 mm.

8. The image reading device according to claim 1, wherein in the second identification processing, in a case in which the control unit searches for the downstream end of the document from the downstream end of the image data toward upstream, when a predetermined number of consecutive pixels correspond to a color of the document, the control unit identifies a position of a pixel farthest downstream of the predetermined number of consecutive pixels corresponding to the color of the document as the downstream end of the document.

9. The image reading device according to claim 1, wherein in the second identification processing, the control unit searches the image data for the downstream end of the document at each of a plurality of positions within the first range, and identifies a position farthest downstream of downstream ends of the document identified by the searching at each of the plurality of positions as the downstream end of the document.

10. An image reading method to be performed by an image reading device, the image reading device including:

a first transport roller configured to transport a document in a predetermined transport direction, a second transport roller provided downstream of the first transport roller in the transport direction and configured to transport the document in the transport direction, a reading sensor provided downstream of the second transport roller and configured to read the document transported, and a document detection sensor provided, in the transport direction, between a position where the first transport roller comes into contact with the document and a position where the second transport roller comes into contact with the document, the document detection sensor being configured to detect the document, the document detection sensor being located at a first position, the first position being a position away from an origin of the reading sensor by a first distance in a width direction intersecting the transport direction, the image reading method comprising:

based on detection of the document by the document detection sensor, starting reading by the reading sensor;

when a size of the document is not specified, performing first identification processing of identifying, for image data generated as a reading result by the reading sensor and using a search line extending to a downstream end of the image data, a region of the document by detecting an edge of the document from the image data generated as the reading result by the reading sensor; and when the size of the document is specified, performing second identification processing of searching the image data, at a position within a first range including the first position in the width direction, for a downstream end of the document from the downstream end of the image data toward upstream in the transport direction, and based on a position of the downstream end of the document identified by the searching, identifying as the region of the document a region corresponding to the size of the document specified, in the second identification processing, when the searching fails to identify the downstream end of the document from the image data, a control unit identifies a position away from the downstream end of the image data toward upstream by a fixed distance set in advance as a substitute for the downstream end of the document.

11. An image reading device, comprising:

a first transport roller configured to transport a document in a predetermined transport direction;

a second transport roller provided downstream of the first transport roller in the transport direction and configured to transport the document in the transport direction;

a reading sensor provided downstream of the second transport roller and configured to read the document transported;

a document detection sensor provided, in the transport direction, between a position where the first transport roller comes into contact with the document and a position where the second transport roller comes into contact with the document, the document detection sensor being configured to detect the document; and a control unit, wherein the document detection sensor is located at a first position, the first position being a position away from an origin of the reading sensor by a first distance in a width direction intersecting the transport direction, based on detection of the document by the document detection sensor, the control unit starts reading by the reading sensor, when a size of the document is not specified, the control unit performs first identification processing of identifying, for image data generated as a reading result by the reading sensor and using a search line extending to a downstream end of the image data, a region of the document by detecting an edge of the document from the image data generated as the reading result by the reading sensor, when the size of the document is specified, the control unit performs second identification processing of searching the image data, at a position within a first range including the first position in the width direction, for a downstream end of the document from the downstream end of the image data toward upstream in the transport direction, and based on a position of the downstream end of the document identified by the searching, identifying as the region of the document a region corresponding to the size of the document specified, in the second identification processing, setting as the region to be read by the reading sensor in a main scanning direction, a size corresponding to the document specified in the main scanning direction, and when the document is inclined, searching for a plurality of downstream ends of the document, identifying, among the downstream ends, the one located farthest downstream as the downstream end of the document, and identifying a region of the document set along the transport direction from the downstream end toward an upstream region.

12. The image reading device of claim 11, wherein when the documents is skewed, a document region that is straight is aligned with the predetermined transport direction is extracted.

* * * * *